Oct. 22, 1957  O. J. VOSS  2,810,295
WASHING MACHINE TRANSMISSION
Filed Feb. 18, 1952

INVENTOR:
OTTO J. VOSS
By Bruininga and ...
ATTORNEYS.

United States Patent Office 2,810,295
Patented Oct. 22, 1957

2,810,295

WASHING MACHINE TRANSMISSION

Otto J. Voss, Normandy, Mo., assignor to The Simmons National Bank, Pine Bluff, Ark., a corporation of the United States, as trustee Application February 18, 1952, Serial No. 272,131

4 Claims. (Cl. 74—82)

This invention relates generally to washing machine transmissions of the character wherein a continuous rotating motion is converted into an oscillatory rotating motion.

In washing machine transmissions of the character referred to, unidirectional rotation is imparted to a drive shaft by a suitable source such as an electric motor. The drive shaft may be and frequently is in the form of a worm enmeshing with a worm wheel, which latter is connected through a crank and pitman or other equivalent means to an agitator shaft which rotates first in one direction and then in the opposite direction during each complete revolution of the crank. In such mechanisms, the end thrust on the worm substantially releases twice in each revolution of the crank, and likewise the thrust between the pitman and the agitator shaft releases twice in each revolution of the crank. This repeated pulsation of the thrusts renders such transmissions quite noisy, and despite the precision of fit at the time of manufacture, so as to substantially eliminate such noise, when the transmissions are worn in and thereafter when they become further worn, the noise increases substantially.

The object of the present invention, generally stated, is to eliminate noise from transmissions of the character aforesaid.

Other objects will become apparent to those skilled in the art when the following description is read in connection with the accompanying drawings in which.

The present invention contemplates that the worm shaft of a washing machine transmission as well as the pitman be provided with spring-actuated wear compensators. In the case of the worm shaft which, in one typical form, makes use of a ball bearing as the thrust-receiving element, a floating seat is provided to receive the end thrust from the ball bearing, and the position of such floating seat is controlled by an adjustment screw. The adjustment screw is constantly biased by a suitable spring tending to turn it in a direction such as to reduce the end play at the worm shaft. The invention especially contemplates that the floating seat be anchored against rotational movement about the axis of the worm shaft so that the rotational movement of the worm shaft cannot be transmitted to the adjustment screw and thus either tighten or loosen the latter. While the screw threads on the adjustment screw, which backs up the floating seat, may be right- or left-hand thread, it is preferable that the parts be arranged so that rotation of the screw about the axis of the worm shaft, in the same direction in which the worm shaft turns when driving, tends to loosen the set screw against the action of the spring.

As embodied in a pitman of the character including a chain drive, the wear take-up device involves a stud anchored to one end of the chain. Said stud extends through a fixed part of the pitman bow and is secured in position by a nut spring biased in a direction tending to tighten the chain.

Figure 1:
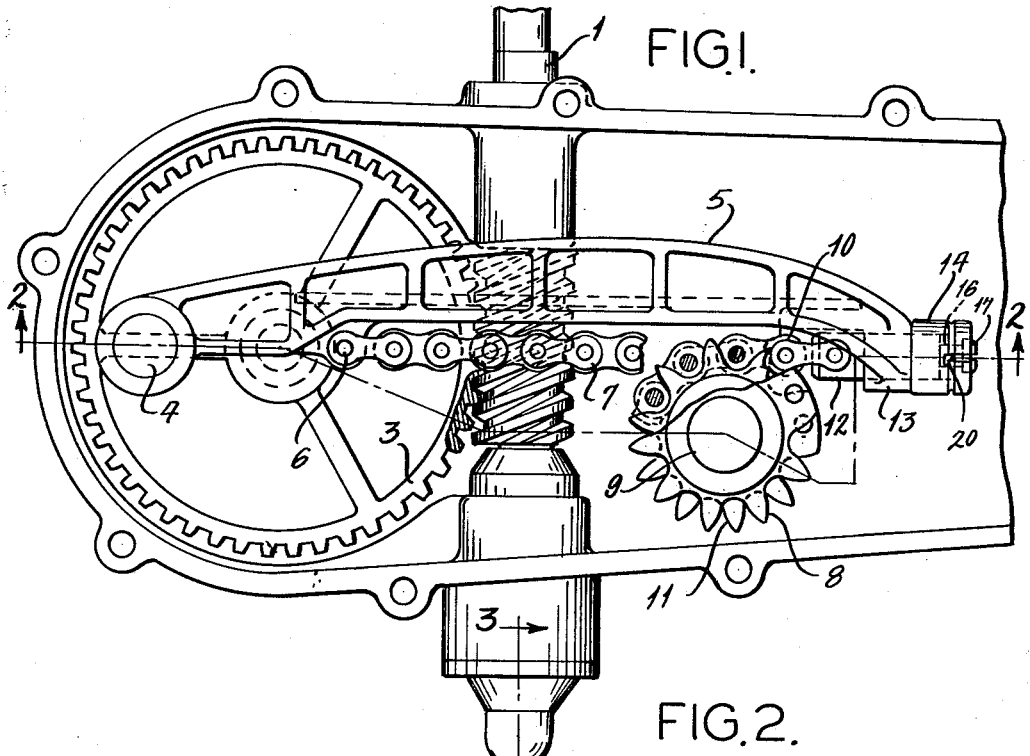
Figure 1 is a plan view of a typical transmission of the character aforesaid and embodying the noise-eliminating features of the present invention.
Figure 2:
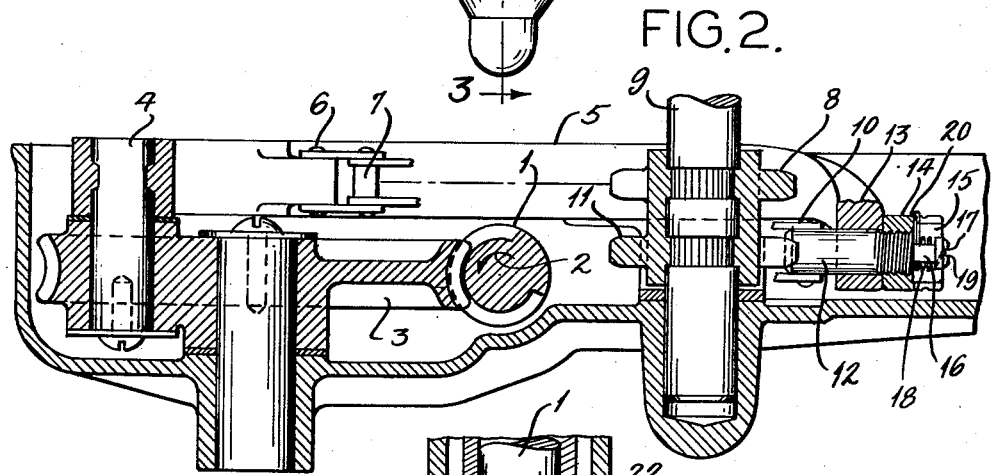
Figure 2 is a sectional view taken along line 2—2 of Figure 1.
Figure 3:
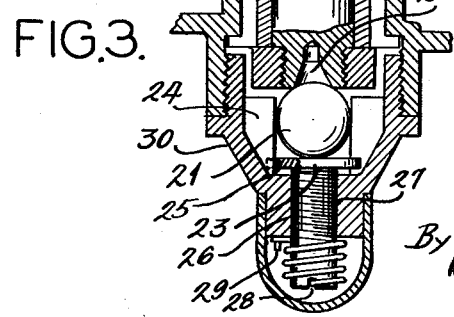
Figure 3 is a sectional view taken along line 3—3 of Figure 1.

Referring now to the drawings for an illustrative embodiment of the invention, a worm shaft 1 is connected in the usual manner to be driven by a motor or other source of rotational power. In the embodiment illustrated, the rotation is in the direction of the arrow 2 (Fig. 2). The worm shaft 1 is meshed with a worm wheel 3, having a crank 4 connected wtih a pitman bow 5. Extending from an anchoring point 6 on the pitman bow is a roller chain 7, the opposite end of which is anchored to a sprocket 8 secured to an agitator shaft 9. Another length of roller chain 10 is anchored to a sprocket 11, likewise secured to the agitator shaft 9, and extends in the opposite direction from chain 7, having its outer end anchored to a stud 12. The elongate member or stud 12 extends through a boss 13 on the supporting member or pitman bow 5 so that the axis of stud 12 is aligned with the center of anchoring point 6 and the center of crank 4. On the side of boss 13 opposite chain 10, stud 12 is screw-threaded and secured by a nut 14. The nut is recessed on one side as shown at 15, and within such recess stud 12 is reduced in diameter so as to provide a collar 16 and a head 17. A coil spring 18 is wound about collar 16, having one end engaged in a slot 19 in the head 17. The opposite end of the spring 18 is passed through a hole or slot in nut 14 and turned over on the exterior thereof as shown at 20 in Figure 1. The torsion exerted by spring 18 is in a direction such as to drive nut 14 farther and farther down on the threaded end of stud 12. Accordingly, when any looseness occurs in the chains 7 and 10, the spring 18 turns nut 14 in a direction such as to take up the slack.

At the end of worm shaft 1, remote from its driving motor, a ball bearing 21 is provided in a suitable housing or supporting member 30 and arranged to engage a recess 22 in the end of worm shaft 1, all in accordance with the usual practice. Ball bearing 21 is forced toward worm shaft 1 by an axially floating seat 23 of hard steel or other wear-resisting material. The seat 23 is free to move in a direction axially of worm shaft 1 but is restrained against rotation about the axis of worm shaft 1 as by being interlocked with one or more ribs 24 which are received within a slot or opening 25 in the edge of seat 23. A set screw 26 extends through the housing about ball bearing 21 so as to be axially aligned with the axis of worm shaft or elongate member 1. The threads on set screw 26 in the embodiment shown, where the rotation of worm shaft 1 is in the direction shown by the arrow 2, are left-hand threads, so that to tighten set screw 26, i. e., moving its end toward shaft 1, the screw 26 must be turned in the opposite sense from the driving direction of shaft 1. A coil spring 27 surrounds the outer end of set screw 26, having one end thereof received within a slot 28 and the other end anchored to a pin 29 secured to the housing for ball bearing 21. The torsion exerted by spring 27 upon set screw 26 is in a direction such as to advance the screw toward shaft 1.

The driving rotation of shaft 1 causes a turning of ball bearing 21, but that turning motion is not transmitted to set screw 26 because the intervening seat 23 is restrained from such turning by the engagement of rib 24 with slot 25. In the course of time, however, some looseness may develop between the rib 24 and the slot 25 so that limited rotational movement of seat 23 may occur. This limited movement, if transmitted to the set screw 26, would, under the conditions aforesaid, tend to loosen said set screw. Twice, in each rotation of worm wheel 3, however, the end thrust is removed from ball bearing 21 and seat 23, and during this interim spring 27 exerts a force upon set screw 26 to take up any slack which has developed between the parts 21, 22, 23, and 26.

In order to minimize the end play in the two lengths of chain 7 and 10, as the mechanism reciprocates, the invention contemplates that the sprockets 8 and 11 be mounted on shaft 9 with their teeth in disalignment so that the teeth on sprocket 8 are arranged on radii which extend between the radii on which the teeth of sprocket 11 lie. With this arrangement of the sprockets and chains, the obliquity of the links in chain 7 as that chain is being wound upon sprocket 8 is neutralized by the obliquity of the links of chain 10 as that chain is being unwound from sprocket 11. This arrangement is in distinct contrast to an arrangement wherein the teeth of sprockets 8 and 11 lie on the same radii, for in the latter instance the link obliquities of the respective chains are cumulative, and hence introduce into the mechanism a substantial increment of lost motion as the shaft 9 turns through the arc which separates the radii on which the respective sprocket teeth lie. The staggered relationship of the teeth as above described, therefore, reduces the work which the slack take-up spring 18 is required to do.

From the aforegoing description, those skilled in the art should readily understand the construction, operation, and advantages of the transmission described and realize that it accomplishes its objects. With the arrangements disclosed, advantage is taken of the two occasions during each revolution of worm wheel 3 wherein strain is removed from the adjustable parts, and on these occasions the springs 18 in the one case and 27 in the other exert a force tending to tighten the respective parts.

While one complete embodiment of the invention has been disclosed in detail, it is to be understood that the disclosure is merely for illustrative purposes, and is not to be considered as limitative upon the invention. Accordingly, such modifications and variations and the substitution of equivalents for the several parts described are not to be considered as a departure from the spirit of the invention or from the scope of the appended claims.

Having thus described the invention, what is claimed and desired to be secured by Letters Patent is:

1. In a washing machine transmission of the character having an elongate member that is held at its end by a supporting member and that is subjected to longitudinal pulsating forces which tend to loosen the connection between said members; the improvement comprising a threaded element interconnecting said two members, said threaded element being rotatable to take up slack between the two members, and a spring rotatably biasing said threaded element in a direction such as to take up slack automatically during the intervals when said members are relatively free of stress, thereby to minimize vibration of said elongate member.

2. Apparatus as set forth in claim 1, wherein said elongate member is intermittently subjected to tension, said elongate member having a threaded extension received through said supporting member for relative axial movement therewith, said threaded element being a nut threaded over said threaded extension.

3. Apparatus as set forth in claim 1, wherein said elongate member is intermittently subjected to compression, said threaded element being a bolt threaded in said supporting member to restrain endwise movement of said elongate member.

4. Apparatus as set forth in claim 3, wherein said elongate member is also rotary, and further including a thrust element on which said elongate member is supported, said thrust element being interposed between the elongate member and the bolt, and key means restraining rotational movement of the thrust element while limiting axial movement thereof.

References Cited in the file of this patent

UNITED STATES PATENTS

| | | |
|---|---|---|
| 562,124 | Doolittle | June 16, 1896 |
| 972,743 | Wild | Oct. 11, 1910 |
| 1,059,313 | Perkins | Apr. 15, 1913 |
| 1,188,979 | Murray et al. | June 27, 1916 |
| 1,201,748 | Luce | Oct. 17, 1916 |
| 1,377,123 | Gnagy | May 3, 1921 |
| 1,380,162 | Spielman | May 31, 1921 |
| 1,537,153 | Stengel | May 12, 1925 |
| 1,542,467 | Moratta | June 16, 1925 |
| 1,696,718 | Kuhlmann | Dec. 25, 1928 |
| 2,267,577 | Rizor | Dec. 23, 1941 |
| 2,334,002 | Heinz | Nov. 9, 1943 |
| 2,389,624 | Know et al. | Nov. 27, 1945 |
| 2,402,266 | Williams | June 18, 1946 |
| 2,435,122 | Beindt | Jan. 27, 1948 |
| 2,634,615 | Voss | Apr. 14, 1953 |

FOREIGN PATENTS

| | | |
|---|---|---|
| 126,393 | Switzerland | June 1, 1928 |
| 217,456 | Switzerland | Feb. 16, 1942 |
| 324,782 | Great Britain | Feb. 6, 1930 |